(12) United States Patent
Grund et al.

(10) Patent No.: US 8,314,992 B1
(45) Date of Patent: Nov. 20, 2012

(54) FIELD WIDENING LENS

(75) Inventors: Christian J. Grund, Boulder, CO (US); Robert M. Pierce, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 13/043,279

(22) Filed: Mar. 8, 2011

Related U.S. Application Data (62) Division of application No. 12/390,226, filed on Feb. 20, 2009, now Pat. No. 7,929,215.

(51) Int. Cl.
*G02B 27/10* (2006.01)
*G02B 27/14* (2006.01)

(52) U.S. Cl. .......................... 359/629; 359/618

(58) Field of Classification Search .................. 359/618, 359/629
See application file for complete search history.

(56) References Cited

U.S. PATENT DOCUMENTS

| | | | |
|---|---|---|---|
| 4,022,532 A | 5/1977 | Montagnino | |
| 4,201,468 A | 5/1980 | Margolis et al. | |
| 4,286,877 A * | 9/1981 | Clarke | 356/455 |
| 4,730,320 A | 3/1988 | Hidaka et al. | |
| 5,029,023 A | 7/1991 | Bearden et al. | |
| 5,091,778 A | 2/1992 | Keeler | |
| 5,192,978 A | 3/1993 | Keeler | |
| 5,317,376 A | 5/1994 | Amzajerdi et al. | |
| 5,345,304 A | 9/1994 | Allen | |
| 5,357,371 A | 10/1994 | Minott | |
| 5,485,009 A | 1/1996 | Meyzonnetie et al. | |
| 5,682,225 A | 10/1997 | DuBois et al. | |
| 5,682,229 A | 10/1997 | Wangler | |
| 5,784,023 A | 7/1998 | Bluege | |
| 5,793,034 A | 8/1998 | Wesolowicz et al. | |
| 5,815,250 A | 9/1998 | Thomson et al. | |
| 5,847,816 A | 12/1998 | Zediker et al. | |
| 5,870,180 A | 2/1999 | Wangler | |
| 5,870,181 A | 2/1999 | Andressen | |
| 5,914,776 A | 6/1999 | Streicher | |

(Continued)

FOREIGN PATENT DOCUMENTS

GB 2300325 10/1996

(Continued)

OTHER PUBLICATIONS

Allen et al., "Full-Scale Testing and Platform Stabilization of a Scanning Lidar System for Planetary Landing", *Space Exploration Technologies* (Wolfgang Fink, ed.), Proceedings of SPIE, vol. 6960, pp. 696004-1-696004-10 (2008).

Bakalski et al., "Real Time Processing Enables Fast 3D Imaging at Single Photon Level", *Laser Radar Technology and Applications XIII*, (Monte D. Turner, Gary W. Kamerman, ed.), Proceedings of the SPIE, vol. 6950, pp. 69500K-1-69500K-9 (2008).

(Continued)

*Primary Examiner* — William Choi
(74) *Attorney, Agent, or Firm* — Sheridan Ross P.C.

(57) ABSTRACT

Field widening lens methods and systems are provided. The field widening lens includes a non-planar primary mirror and a secondary mirror. In addition, separate input and output ports are provided. The field widening lens further provides for an optical path difference for rays within the lens that is essentially zero for any ray within the field of view of an optical system including the field widening lens, regardless of the angle at which the ray entered the lens.

6 Claims, 7 Drawing Sheets

U.S. PATENT DOCUMENTS

| | | | |
|---|---|---|---|
| 5,917,596 | A | 6/1999 | Jenkins et al. |
| 5,923,466 | A | 7/1999 | Krause et al. |
| 6,034,770 | A | 3/2000 | Kim et al. |
| 6,173,066 | B1 | 1/2001 | Peurach et al. |
| 6,323,941 | B1 | 11/2001 | Evans et al. |
| 6,411,871 | B1 | 6/2002 | Lin |
| 6,414,746 | B1 | 7/2002 | Stettner et al. |
| 6,434,211 | B1 | 8/2002 | Lloyd et al. |
| 6,448,572 | B1 | 9/2002 | Tennant et al. |
| 6,542,831 | B1 | 4/2003 | Moosmuller et al. |
| 6,608,669 | B2 | 8/2003 | Holton et al. |
| 6,646,725 | B1 | 11/2003 | Eichinger et al. |
| 6,657,733 | B1 | 12/2003 | Drake |
| 6,664,529 | B2 | 12/2003 | Pack et al. |
| 6,665,063 | B2 | 12/2003 | Jamieson et al. |
| 6,747,258 | B2 | 6/2004 | Benz et al. |
| 6,804,607 | B1 | 10/2004 | Wood |
| 6,943,868 | B2 | 9/2005 | Haig |
| 6,972,887 | B2 | 12/2005 | Wickham et al. |
| 7,006,203 | B1 | 2/2006 | Book et al. |
| 7,095,488 | B2 | 8/2006 | Jamieson et al. |
| 7,113,886 | B2 | 9/2006 | West |
| 7,142,981 | B2 | 11/2006 | Hablani |
| 7,224,466 | B2 | 5/2007 | Ray |
| 7,224,707 | B2 | 5/2007 | Gendron |
| 7,236,235 | B2 | 6/2007 | Dimsdale |
| 7,240,879 | B1 | 7/2007 | Cepollina et al. |
| 7,277,641 | B1 | 10/2007 | Gleckman |
| 7,342,228 | B1 | 3/2008 | O'Connell et al. |
| 7,345,743 | B1 | 3/2008 | Hartman et al. |
| 7,359,057 | B2 | 4/2008 | Schwiesow |
| 7,397,568 | B2 | 7/2008 | Bryce et al. |
| 7,406,220 | B1 | 7/2008 | Christensen et al. |
| 7,436,494 | B1 | 10/2008 | Kennedy et al. |
| 7,453,552 | B1 | 11/2008 | Miesak et al. |
| 7,580,132 | B2 | 8/2009 | Baillon et al. |
| 2002/0117340 | A1 | 8/2002 | Stettner |
| 2003/0063884 | A1 | 4/2003 | Smith et al. |
| 2004/0021852 | A1 | 2/2004 | DeFlumere |
| 2004/0119838 | A1 | 6/2004 | Griffis et al. |
| 2004/0130702 | A1 | 7/2004 | Jupp et al. |
| 2004/0213463 | A1 | 10/2004 | Morrison |
| 2005/0060092 | A1 | 3/2005 | Hablani |
| 2005/0099634 | A1 | 5/2005 | Dubois et al. |
| 2006/0088946 | A1 | 4/2006 | Willson et al. |
| 2006/0114447 | A1 | 6/2006 | Harris et al. |
| 2006/0132752 | A1 | 6/2006 | Kane |
| 2006/0136172 | A1 | 6/2006 | O'Kane et al. |
| 2006/0197936 | A1 | 9/2006 | Liebman et al. |
| 2007/0073486 | A1 | 3/2007 | Tillotson et al. |
| 2007/0110364 | A1 | 5/2007 | Rice et al. |
| 2007/0115541 | A1 | 5/2007 | Rogers et al. |
| 2007/0122001 | A1 | 5/2007 | Wang et al. |
| 2007/0171407 | A1 | 7/2007 | Cole et al. |
| 2007/0263676 | A1 | 11/2007 | Beukema et al. |
| 2008/0023587 | A1 | 1/2008 | Head et al. |
| 2008/0136626 | A1 | 6/2008 | Hudson et al. |
| 2008/0212328 | A1 | 9/2008 | Minano et al. |
| 2008/0273560 | A1 | 11/2008 | Stelmakh |
| 2008/0290259 | A1 | 11/2008 | Mathewson et al. |
| 2008/0316498 | A1 | 12/2008 | Drake et al. |
| 2009/0002680 | A1 | 1/2009 | Ruff et al. |
| 2009/0046289 | A1 | 2/2009 | Caldwell et al. |
| 2009/0059201 | A1 | 3/2009 | Willner et al. |
| 2009/0110267 | A1 | 4/2009 | Zakhor et al. |
| 2009/0115994 | A1 | 5/2009 | Stettner et al. |
| 2009/0142066 | A1 | 6/2009 | Leclair et al. |
| 2009/0237640 | A1 | 9/2009 | Krikorian et al. |
| 2009/0273770 | A1 | 11/2009 | Bauhahn et al. |
| 2009/0310118 | A1 | 12/2009 | Halldorsson |
| 2010/0165323 | A1 | 7/2010 | Fiess et al. |

FOREIGN PATENT DOCUMENTS

| | | |
|---|---|---|
| GB | 2306828 | 5/1997 |
| GB | 2364840 | 2/2002 |
| WO | WO 02/04982 | 1/2002 |
| WO | WO 02/065155 | 8/2002 |
| WO | WO 2007/081628 | 7/2007 |
| WO | WO 2009/133414 | 11/2009 |

OTHER PUBLICATIONS

Baker et al., "Advanced Infrared Detectors for Multimode Active and Passive Imaging Applications" *Infrared Technologies and Applications XXXIV* (Bjorn F. Andresen, Gabor F. Fulop, and Paul R. Norton, ed.), Proceedings of the SPIE, vol. 6940, pp. 69402L-1-69402L-11 (2008).

Brady and Schwartz, "ALHAT System Architecture and Operational Concept", Aerospace Conference, 2007 IEEE, Big Sky, MT, IEEEAC Paper # 1570, Version 4, pp. 1-13 (2007).

Cho et al., "Real-Time 3D Ladar Imaging", 35th Applied Imagery and Patern Recognition Workshop, pp. 5 (2006).

Craig et al., "Processing 3D Flash LADAR Point-Clouds in Real-Time for Flight Applications", *Sensors and Systems for Space Applications* (Richard T. Howard and Robert D. Richards, ed.), Proceedings of SPIE, vol. 6555, pp. 65550D-1-65550D-9 (2007).

Dissly et al., "Flash LIDAR Systems for Planetary Exploration", American Astronomical Society, DPS Meeting, Presentation # 40, Ithaca, NY, Bulletin of the American Astronoimical Society, vol. 41, pp. 560 (2008).

Fay et al., "Fusion of Multi-Sensor Pasive and Active 3D Imagery", *Enhanced and Synthetic Vision 2001* (Jacques G. Verly, ed.), Proceedings of SPIE, vol. 4363, pp. 219-230 (2001).

Gillula, "Data Fusion From Multiple Sensors: Real-Time Mapping on an Unmanned Ground Vehicle", 2005 SURF Final Report, California Institute of Technology, 13 pgs (2005).

Habbit et al., "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).

Hyde et al., "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).

De Lafontaine et al., "LAPS: The Development of a Scanning Lidar System with GNC for Autonomous Hazard Avoidance and Precision Landing"; *Spaceborne Sensors* (Robert D. Habbit, Jr. and Peter Tchoryk, Jr., ed.), Proceedings of SPIE, vol. 5418, pp. 81-93 (2004).

Lamoreux et al., "Relative Navigation Sensor for Autonomous Rendezvous and Docking", *Laser Radar Technology and Applications VIII* (Gary W. Kamerman, ed.), Proceedings of the SPIE, vol. 5086, pp. 317-328 (2003).

Lefsky et al., "Estimates of Forest Canopy Height and Aboveground Biomass Using ICESat", Geophysical Research Letters, vol. 32, L2202, 4 pages (2005).

Marino and Davis, Jr., "Jigsaw: A Foliage-Penetrating 3D Imaging Laser Radar System"; Lincoln Laboratory Journal, vol .15, No. 1, pp. 23-36 (2005).

Oberle and Davis, "Toward High Resolution, Ladar-Quality 3-D World Models Using Ladar-Stereo Data Integration and Fusion," Army Research Laboratory, ARL-TR-3407, 37 pgs (2005).

Pack et al., "A Co-Boresighted Synchronized Ladar/EO Imager for Creating 3D Images of Dynamic Scences", *Laser Radar Technology and Applications*, X (Gary W. Kamerman, ed.), Proceedings of SPIE, vol. 5791, pp. 42-50 (2005).

Pierrottet et al., "Characterization of 3-D Imaging Lidar For Hazard Avoidance and Autonomous Landing on the Moon"; *Laser Radar Technology and Applications XII* (Monte D. Turner and Gary W. Kamerman, ed.), Proceedings of SPIE, vol. 6550, pp. 655008-1-655008-9 (2007).

Riris et al., "The Lunar Orbiter Laser Altimeter (LOLA) on NASA's Lunar Reconnaissance Orbirot (LRO) Mission", *Sensors and Systems for Space Applications* (Richard T. Howard and Robert D. Richards, ed.), Proceedings of SPIE, vol. 6555, pp. 655501-1-655501-8 (2007).

Roberts, Jr. and LeVan, "Aperture Sharing Between Low-Background Infrared Sensors and Ladar Sensors", Aerospace Applications Conference, Proceedings of the IEEE, vol. 4, pp. 495-508 (1996).

Smith et al., "Diffractive Optics for Moon Topography Mapping"; *Micro (MEMS) and Nanotechnologies for Space Applications* (Thomas George and Zhong-Yang Cheng, ed.), Proceedings of SPIE, vol. 6223, pp. 622304-1-622304-10 (2006).

Stentz et al., "Real-Time, Multi-Perspective Perception for Unmanned Ground Vehicles", Proceedings of the Association for Unmanned Vehicle Systems International, 15 pgs (2003).

Stettner et al., "Three Dimensional Flash Ladar Focal Planes and Time Dependent Imaging" Advanced Scientific Concepts, Inc., 5 pgs (Undated).

Tan and Narayanan, "Design and Performance of a Multiwavelength Airborne Polarimetric Lidar for Vegetation Remote Sensing"; Journal of Applied Optics, vol. 43, No. 11, pp. 2360-2368 (2004).

Trenkle et al., "3D Sensor Algorithms for Spacecraft Pose Determination", *Spaceborne Sensors III* (Richard T Howard and Robert D. Richards, ed.), Proceedings of SPIE, vol. 6220, pp. 62200D-1-62200D-14 (2006).

Weinberg et al., "Flash Lidar Systems for Hazard Detection, Surface Navigation and Autonomous Rendezvous and Docking", 2007 LEAG Workshop on Enabling Exploration, 2 pgs (2007).

Yoon et al., "High Frequency Attitude Motion of ICESat", *Advances in Astronautical Sciences* (David A. Vollado, Michael J. Gabor and Prasun N. Desai ed.), vol. 120: Spaceflight Mechanics, Part 1, pp. 117-131 (2005).

Robert C. Fenton, "A LADAR-Based Pose Estimation Algorithm for Determining Relative Motion of a Spacecraft for Autonomous Rendezvous and Dock", Master of Science thesis, Utah State University, 90 pages (2008).

Chen et al., "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Vasile et al., "Pose-Independent Automatic Target Detection and Recognition Using 3D Laser Radar Imagery", Lincoln Laboratory Journal, vol. 15, No. 1, 18 pages (2005).

Ruel et al., "Field Testing of a 3D Automatic Target Recognition and Pose Estimation Algorithm", Automatic Target Recognition XIV, SPIE vol. 5426, 10 pages (2004).

Allen et al., "Rendezvous Lidar Sensor System for Terminal Rendezvous, Capture, and Berthing to the International Space Station", Sensors and Systems for Space Applications II, SPIE vol. 6958, 8 pages (2008).

Jasiobedzki et al., "Autonomous Satellite Rendezvous and Docking Using LIDAR and Model Based Vision", Spaceborne Sensors II, SPIE vol. 5798, 12 pages (2005).

Fenton et at, "Simulation Tests of a Lidar-based Spacecraft Pose Determination Algorithm", Sensors and Systems for Space Applications, SPIE vol. 6555, 11 pages (2007).

Ruel et al., "Real-Time 3D Vision Solution for On-Orbit Autonomous Rendezvous & Docking", Spaceborne Sensors III, SPIE 6220, 11 pages (2006).

Wikipedia, "RANSAC", available at http://en.wikipedia.org/wiki/RANSAC, 5 pages (2009).

Grund et al., Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, Co, Jun. 23-27, 2008, 1 page.

Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.

Grund et al., Presentation Entitled "Optical Autocovariance Wind Lidar and Performance from LEO", presented at the Coherent Laser Radar Conference, Jul. 11, 2007, 30 pages.

International Search Report and Written Opinion for International Patent Application Serial No. PCT/US2010/021213, mailed Mar. 22, 2010, 8 pages.

Kasten, et al., "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.

Aerius Photonics website, "Aerius NIR/SWIR Illuminators" product sheet, available at http://www.aeriusphotonics.com/datasheets.html, 2 pages (2009).

Brian F. Aull et al., "Geiger-Mode Avalanche Photodiodes for Three-Dimensional Imaging", Lincoln Laboratory Journal, vol. 13, No. 2 (2002).

Didier Bruneau, "Mach-Zehnder Interferometer as a Spectral Analyzer for Molecular Doppler Wind Lidar", Applied Optics, vol. 40, No. 3, pp. 391-399 (2001).

Didier Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Pierre Connes and Guy Michel, "Astronomical Fourier Spectrometer", Applied Optics, vol. 14, No, 9, pp. 2067-2084 (1975).

Degnan, John J., "Photon-Counting Multikilohertz Microlaser Altimeters for Airborne and Spaceborne Topographic Measurements", Journal of Geodynamics, vol. 34, pp. 503-549 (2002).

T.S. Durrani and C.A. Greated, "Spectral Analysis and Cross-Correlation Techniques for Photon Counting Measurements on Fluid Flows", Applied Optics, vol. 14, No. 3, pp. 778-794 (1975).

W.A. Gault, et al., "ERWIN: An E-Region Wind Interferometer", Applied Optics, vol. 35, No. 16, pp. 2913-2922 (1996).

Gentry, Bruce et al., "The Tropospheric Wind Lidar Technology Experiment (TWiLiTE): An Airborne Direct Detection Doppler Lidar Instrument Development Program", available at http://esto.nasa.gov/conferences/estc2006/papers/b8p2.pdf.

Pierre Jacquinot, "*The Luminosity of Spectrometers with Prisms, Gratings, or Fabry-Perot Etalons*", Journal of the Optical Society of America, vol. 44, No. 10, pp. 761-765 (1954).

V. Nirmal Kumar and D. Narayana Rao, "*Determination of the Instrument Function of a Grating Spectrometer by Using White-Light Interferometry*", Applied Optics, vol. 36, No. 19, pp. 4535-4539 (1997).

Lieber, Mike et al., "Development of a Validated End-to-End Model for Space-Based Lidar Systems", *Lidar Remote Sensing for Environmental Monitoring VIII* (Singh, Upendra N. ed.), Proceedings of the SPIE, vol. 6681, 66810F (2007).

Lieber, Mike et al., "System Verification of the JMEX Mission Residual Motion Requirements with Integrated Modeling", *UV/Optical/IR Space Telescopes: Innovative Technologies and Concepts II* (MacEwen, Howard A. ed.), Proceedings of the SPIE, vol. 5899, 589901, pp. 1-12 (2005).

Lieber, Mike et al., "Integrated System Modeling for Evaluating the Coronagraph Approach to Plant Detection", *High-Contrast Imaging for Exo-Planet Detection* (Schultz, Alfred B. ed.), Proceedings of the SPIE, vol. 4860 (2002). (Abstract only).

W.T. Mayo, Jr., "Photon Counting Processor for Laser Velocimetry", Applied Optics, vol. 16, No. 5, pp. 1157-1162 (1977).

G.A. Morton, "Photon Counting", Applied Optics, vol. 7, No. 1, pp. 1-10 (1968).

Rabinovich, W.S. et al., "45 Mbps Cat's Eye Modulating Retro-Reflector Link Over 7 Km", *Free-Space Laser Communications VI*, Proceedings of the SPIE, vol. 6304, pp. 63040Q (2006). (Abstract only).

Robert L. Richardson and Peter R. Griffiths, "Design and Performance Considerations of Cat's Eye Retroreflectors for Use in Open-Path Fourier-Transform-Infrared Spectrometry", Applied Optics, vol. 41, No. 30, pp. 6332-6340 (2002).

J. Ring and J.W. Schofield, "Field-Compensated Michelson Spectrometers", Applied Optics, vol. 11, No. 3, pp. 507-516 (1972).

Gordon G. Shepherd et al., "WAMDII: Wide-Angle Michelson Doppler Imaging Interferometer for Spacelab", Applied Optics, vol. 24, No. 11, pp. 1571-1584 (1985).

Gordon G. Shepherd et al., "WINDII—The Wind Imaging Interferometer for the Upper Atmosphere Research Satellite", Geophys. Res. vol. 98, No. D6, pp. 10,725-10,750 (1993).

Vallerga, John et al., "Noiseless, High Frame Rate (>KHz), Photon Counting Arrays for Use in the Optical to the Extreme UV", University of California, Berkeley—Sciences Laboratory and University of Geneva, Switzerland, available at http://www.ssl.berkeley.edu/~mcphate/AO/ao_medipix.html (2004-present).

Shiquang Wang, Gordon G. Sheperd, and William E. Ward, "Optimized Reflective Wide-Angle Michelson Phase-Stepping Interferometer", Applied Optics, vol. 39, No. 28, pp. 5147-5160, (2000).
Grund, et al. "Enabling Characteristics of Optical Autocovariance Lidar for Global Wind and Aerosol Profiling", AGU, American Geophysical Union, Fall Meeting, San Francisco, CA (Dec. 16, 2008).
Grund, Chris, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).
Grund, Christian et al., "Optical Autocovariance Wind Lidar and Performance from LEO", 14th Coherent Laser Radar Conference, Snowmass, Co (Jul. 7, 2007).
Grund, Christian et al., "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).
Grund, Christian, et al., "Simultaneous Profiling of Aerosol Optical Properties, Gas Chemistry, and Winds with Optical Autocovariance Lidar", 24th ILRC Conference (Jun. 23, 2008).
Chris Grund, "Lidar Wind Profiling from Geostationary Orbit Using Imaging Optical Autocovariance Interferometry", Space Winds Lidar Working Group, Snowmass, CO (Jul. 17, 2007).
Grund, et al., "Optical Autocovariance Wind Lidar (OAWL) for Efficient Space-Based Direct-Detection High-Resolution Aerosol Backscatter Winds", International Laser Radar Conference, Boulder, CO (Jun. 24, 2008).
U.S. Appl. No. 12/357,171, filed Jan. 21, 2009.
U.S. Appl. No. 12/357,251, filed Jan. 21, 2009.
Grund et al., "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.
Grund et al., "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.
Notice of Allowance and Fee(s) Due for U.S. Appl. No. 12/464,009, mailed Jan. 31, 2011, 10 pages.
Official Action for U.S. Appl. No. 12/357,251, mailed Mar. 11, 2011, 23 pages.
Restriction Requirement for U.S. Appl. No. 12/390,226, mailed Aug. 31, 2010, 6 pages.
Notice of Allowance and Fee(s) Due for U.S. Appl. No. 12/390,226, mailed Dec. 17, 2010, 23 pages.
Notice of Allowance and Fee(s) Due for U.S. Appl. No. 12/357,171, mailed Dec. 6, 2011, 32 pages.
International Search Report and Written Opinion for International Application No. PCT/US2010/033559, mailed Jul. 6, 2010, 9 pages.
International Preliminary Report on Patentability for International Application No. PCT/US2010/033559, mailed Nov. 24, 2011, 8 pages.
Notice of Allowance and Fee(s) Due for U.S. Appl. No. 12/357,251, mailed Sep. 13, 2011, 11 pages.
Restriction Requirement for U.S. Appl. No. 13/341,640, mailed Mar. 7, 2012, 6 pages.
International Search Report and Written Opinion for International Patent Application Serial No. PCT/US11/46689, mailed Mar. 20, 2012, 15 pages.
International Preliminary Report on Patentability for International Patent Application Serial No. PCT/US2010/021213, mailed Aug. 4, 2011, 7 pages.

* cited by examiner

FIG.8 and imaging systems incorporating the field widening lens of embodiments of the present invention.

FIELD WIDENING LENS

CROSS-REFERENCE TO RELATED APPLICATIONS

This is a divisional application of U.S. patent application Ser. No. 12/390,226, filed Feb. 20, 2009, the entire disclosure of which is hereby incorporated herein by reference.

FIELD

An optical system incorporating a field widening lens is provided. More particularly, interferometric systems in which at least some of the flat mirrors of conventional optical systems are replaced by curved mirrors are provided.

BACKGROUND

Large field of view is a critical parameter for the implementation of many optical systems. For example, practical implementations of high spectral resolution space based optical systems, such as direct detection Doppler wind lidars, require a receiver field of view (FOV) large enough to encompass a laser beam of sufficient divergence as to meet near surface eye-safety requirements, and allow for reasonable thermal wander between the receiver and transmitter optic axes. Typically, this receiver FOV is on the order of 100 microradians. Furthermore, to acquire sufficient signal from orbit, large collection optics on the order of 1 meter diameter are required. To minimize mass, volume, and cost of the interferometer components, the large diameter beam from the collection telescope is typically recollimated to the smaller diameter of practical interferometer optics, typically 50 mm or less. Because the étendu or optical throughput of optical systems is conserved, the product of the beam diameter and its divergence remains a fixed property of the system. Consequently, a magnified field angle (order of several milliradians) is experienced within the interferometer. In general, the spectral or phase resolution of interferometers is dependent on the angular divergence of the light propagating within the interferometric path because rays of different angles traverse different path lengths producing wavefront or phase errors. Therefore, as field of view of the system increases, the spectral and phase resolution of the system decrease.

Techniques for widening the operative field of view of optical devices have been developed and proposed. For example, field widened interferometers have used combinations of different types of glass to compensate interferometer path length changes with field angle. However, the use of large blocks of glass results in the absorption and scattering of optical signals, limiting operational wavelengths. In addition, the blocks of glass typically have limited index of refraction homogeneity, affecting intra-interferometer wavefront and resolution. In addition, the use of large blocks of glass implies increased mass, which is a particular disadvantage in connection with optical systems intended for airborne or space borne deployment. Accordingly, while such refractive compensation can be effective at improving contrast for larger field of view instruments, they are incapable of improving the effect of wavefront error, and can in fact increase such error. In addition, for large optical path differences, the refractive method requires adding large amounts of refractive material, which can itself reduce contrast because of refractive index inhomogeneities, in some cases due to thermal gradients in the large glass blocks. Thus, in large optical path difference interferometers (i.e. high spectral and phase resolution), the refractive method compounds the effect of poor wavefront error, since the wavefront from short and long arms can be substantially different, resulting in low contrast fringes. In addition, refractive solutions are not practical at ultraviolet wavelengths, where glass absorption is high, and such solutions complicate multiple simultaneous wavelength operation due to dispersion.

Cat's eye mirrors that alter the optical path length traversed by optical rays across the field of view of an instrument have been made. However, these systems have an obscuration when implemented as part of a Michelson interferometer, and, by symmetry, cannot use phase mask, or phase mirror technology that is essential for high speed applications. Moreover, the obscuration means that any sufficiently complicated wavefront will not be invariant (i.e., the input and output will not be identical). This is a particularly important effect if the input light is from a multimode optical fiber, where the wavefront is extremely complicated and where any diffraction losses, such as occur at an obscuration, quickly alter the shape and phase of the wavefront. In addition, tolerance to front end optical wavefront errors is particularly important in controlling the cost and mass of signal collection and routing optics.

A standard (flat mirror) Michelson or Mach-Zehnder interferometer works well with larger fields of view and significant wavefront error only if the optical path difference within the instrument is small. With moderately large optical path difference (for increased spectral and phase sensitivity), as the field of view increases or the incident wavefront worsens, the interferogram contrast degrades. The primary problem has been increasing the optical path difference while maintaining a moderately high field of view, without the need for an input signal with a high quality wavefront. Other problems include simultaneous or sequential operation at multiple wavelengths and at high speed to accommodate usual lidar (light detection and ranging) return signals. Still another problem is calibration of the interferometer at a high data rate without introducing additional losses.

Accordingly, it would be desirable to provide an interferometer that is spectrally sensitive while simultaneously operating at high speed, with a moderate field of view, and at multiple wavelengths, with possibly poor wavefront quality or a highly speckled multi-mode fiber input. It would also be desirable to provide optical systems, including interferometers that provide high contrast and resolution even with a large field of view in single pixel and imaging systems.

SUMMARY

Methods and apparatuses directed to solving these and other problems and disadvantages of the prior art are provided. In particular, a field widening lens or cat's eye optical system is provided. The field widening lens provides a reimaging system such that the incident wavefront is reproduced at the exit of the optical system or at the exit of the portion of the optical system comprising the field widening lens. For example, the incident wavefront is reproduced at the exit of each arm of a Michelson or Mach-Zehnder interferometer incorporating the field widening lens of embodiments of the present invention. Specifically, the field widening lens reimages the input at the output. More specifically, the output image can be a conjugate of the input image. Therefore, in a multiple arm interferometer, the wavefront and intensity variation from each arm matches, and therefore a high contrast interference pattern is produced. In addition, the field widening mirror assembly performs angle compensation so that the path length of rays in the field widening lens are the same over the operative field of view of the instrument or optical system, regardless of the input angle of the ray with respect to the central axis of the field of view of the optical system. Embodiments of the present invention also eliminate the obscuration present in a conventional system incorporating a cat's eye mirror, and provide different input and output paths.

A dual field widening lens assembly interferometer in accordance with at least some embodiments of the present invention includes multiple field widening lenses, each having a powered primary and a flat or powered secondary reflector. Such a lens assembly is sometimes referred to as a cat's eye reflector. The multiple field widening lenses can comprise the arms of an unequal path length interferometer. In accordance with other embodiments of the present invention, the field widening lenses can provide equal or symmetrical path lengths, for example as part of an etalon. In accordance with still other embodiments of the present invention, one arm or segment of an interferometer may feature a cat's eye reflector, while the other arm or segment may comprise a planar primary reflector or mirror. In general, a field widening lens in accordance with embodiments of the present invention provides an optical path difference that is zero or substantially zero for any light that is within the field of view of the optical system that includes the field widening lens. As used herein, an optical path difference is negligible (i.e., is essentially or substantially zero) if the maximum difference in path length for any two rays within the FOV of the field widening lens is less than ¼ wave of the shortest wavelength being investigated.

The provision of a field widening lens that removes the obscuration present in conventional cat's eye systems allows the output from the field widening lens to be identical, or more nearly identical, to the input. For example, diffraction losses, such as occurs at an obscuration, and that alter the mode, shape and phase of a wavefront caused by the obscuration, can be eliminated. In addition, by providing offset input and output ports, the design of an optical system incorporating a field widening lens in accordance with embodiments of the present invention can be simplified. The multiple input and output ports available using at least some embodiments of the present invention also facilitate the incorporation of the field widening lens into optical devices requiring multiple inputs and outputs.

Additional features and advantages of embodiments of the present invention will become more readily apparent from the following description, particularly when taken together with the accompanying drawings.

DETAILED DESCRIPTION

Figure 1:
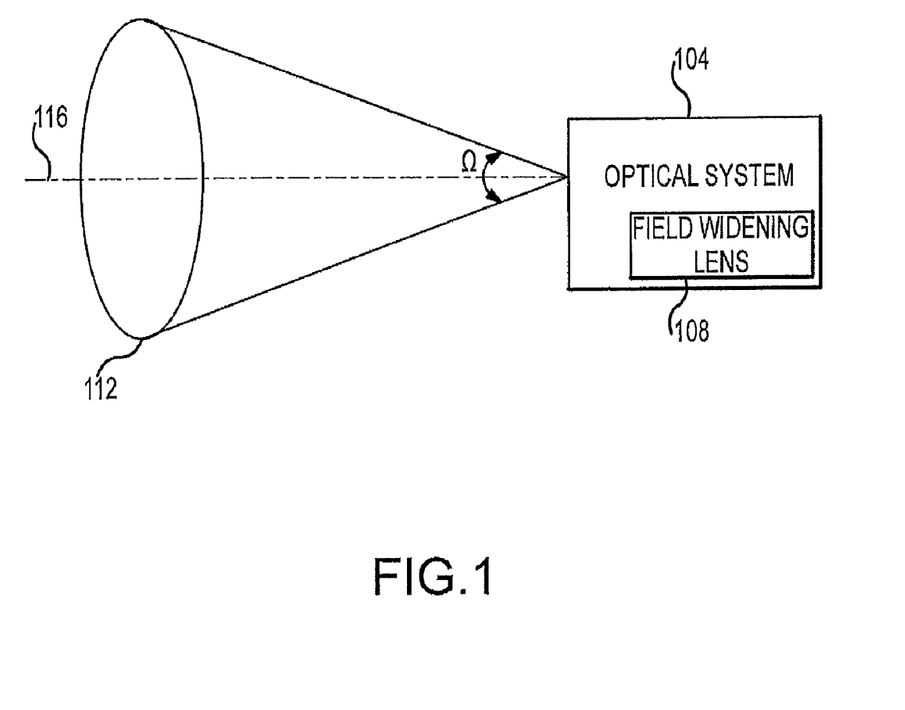
FIG. 1 is a depiction of an optical system and an associated field of view in accordance with embodiments of the present invention.

FIG. 1 depicts an optical system 104, including an optical system 104 incorporating one or more field widening lenses or cat's eye assemblies 108 in accordance with embodiments of the present invention, and an associated field of view 112 encompassed by the solid angle $\Omega$ and centered about a central axis 116. Examples of an optical system 104 that can incorporate a field widening lens 108 in accordance with embodiments of the present invention include interferometers, such as Michelson interferometers, Mach-Zehnder interferometers, other interferometers used for spectrometry, and etalons. As can be appreciated by one of skill in the art, a wide field of view 112 is desirable in many optical systems 104. However, as the field of view 112 of an optical system 104 increases, it has been difficult to maintain aspects of an image collected by the optical system 104, for example as is necessary for high resolution optical systems 104.

Figure 2:
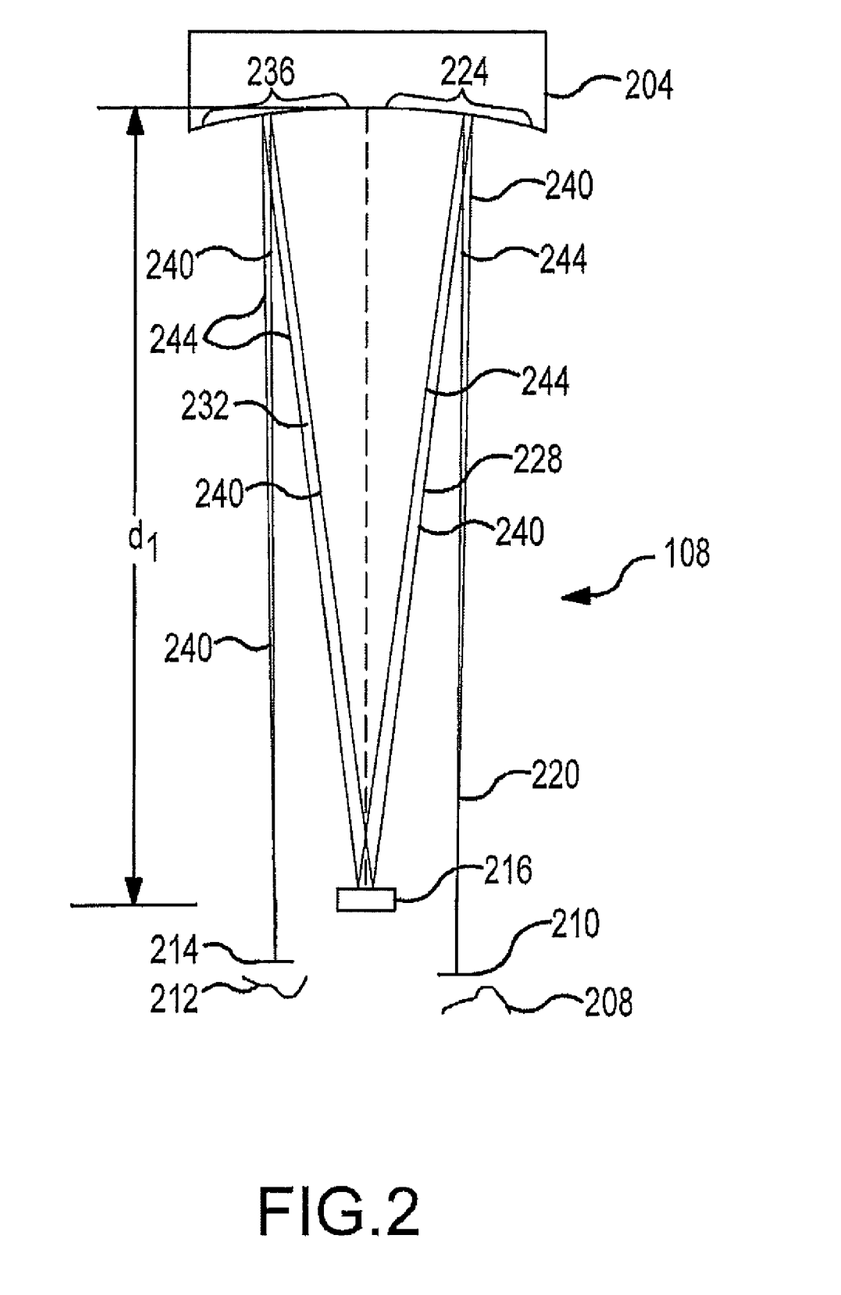
FIG. 2 is a depiction of a field widening lens in accordance with embodiments of the present invention.

FIG. 2 illustrates a field widening lens 108 in accordance with embodiments of the present invention. In general, the field widening lens 108 includes a non-planar primary mirror 204. The non-planar primary mirror 204 is shaped such that an image 208 input to the 108 is reimaged as an output image 212 that is a conjugate of and the same size as the input image 208. Moreover, the incident wavefront of the image 208 is reproduced at the exit or output. This is accomplished by providing a primary mirror 204 that, in cooperation with a secondary mirror 216, provides an optical path difference (OPD) for each ray within the field of view 112 of the optical system 104 between the input 210 of the field widening lens 108 and the output 214 of the field widening lens 108 is zero or essentially zero. In order to achieve this result, the non-planar primary mirror 204 may have a spheric or aspheric section including circles, ellipses, hyperbolas, parabolas, or other non-conic sections. The secondary mirror 216 may have a planar or a spherical section. In accordance with still other embodiments, the secondary mirror 216 may have a non-planar, aspheric section.

As shown, light comprising an image 208 enters through the input port 210 and travels along a first ray segment 220 between the input port 210 and a first portion 224 of the primary mirror 204. The light comprising the image is reflected from the first portion 224 of the primary mirror 204 along a second segment 228 to the secondary mirror 216. The secondary mirror 216 reflects the light comprising the image along a third segment 232 to a second portion 236 of the primary mirror 204. The light comprising the image is then reflected from the second portion 236 of the primary mirror 204 to the output port 214 along a fourth segment 240, to provide the reimaged and preserved wavefront as part of the conjugate image 212 that is output by the field widening lens 108. In addition, the input port 210 is offset from the output port 214, and separate input and output paths are provided.

As noted, the OPD for any ray within the field of view or operative field of view of the optical system 104 is zero or essentially zero. For example, the OPD for ray A 240, originating from a first point at a first angle with respect to the central axis 116 of the field of view 112, as it travels between the input 210 and the output 214, is the same as the OPD for ray B 244, originating from a second point at a second angle with respect to the central axis 116 of the field of view 112, as it travels between the input 210 and the output 214.

Figure 3:
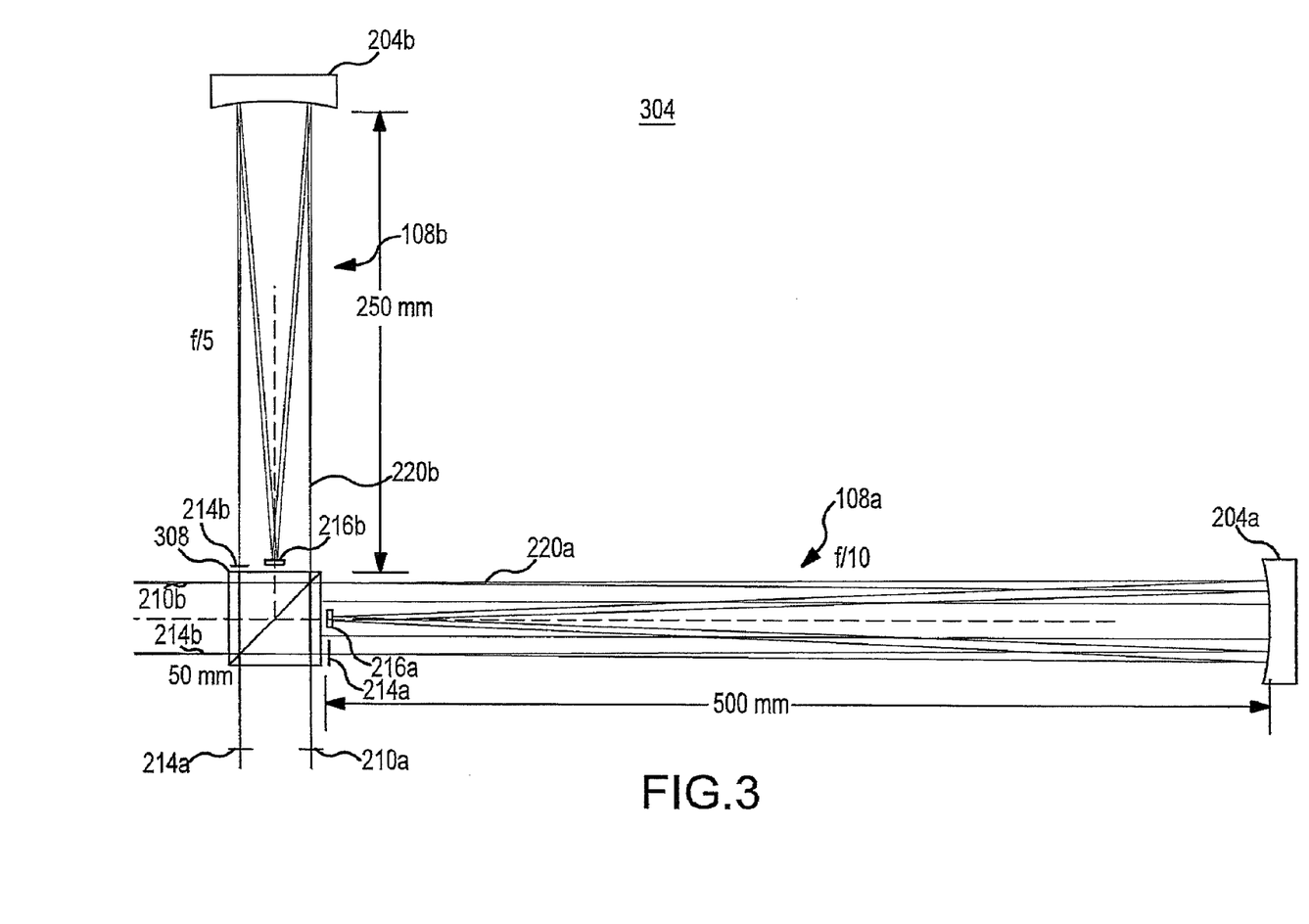
FIG. 3 is a depiction of a portion of an optical system incorporating two field widening lenses in accordance with embodiments of the present invention.

FIG. 3 depicts an interferometer 304 having a first field widening lens 108a and a second field widening lens 108b. A beam splitter 308 divides light input through a first input port 210a between a first segment 220a that is reflected into the first field widening lens 108a, and another first segment 220b passed to the second field widening lens 108b. In the dual field widening lens system of FIG. 3, the first field widening lens 108a comprises the long arm of the interferometer 304, while the second field widening lens 108b comprises a short arm of the interferometer 304. As can be appreciated by one of skill in the art, the interferometer can also be constructed so that the beam splitter 308 reflects light into the short arm and passes light into the long arm. The primary mirror 204a of the first field widening lens 108a cooperates with the secondary mirror 216a of the first field widening lens 108a to produce a reimaged version of the input wavefront at the output 214a of the first field widening lens 108a that is delayed by a first amount. The primary mirror 204b of the second field widening lens 108b cooperates with the secondary mirror 216b of the second field widening lens 108b to produce a reimaged version of the input wavefront at the output 214b of the second field widening lens 108b that is delayed by a second amount. The image output by the two cat's eye assemblies 108a and 108b is a conjugate of the input image wavefront, but is otherwise unaltered. That is, the shape of the wavefront and the size of the image are unaltered. Accordingly, the interference pattern resulting from the combination of the differentially delayed output images in the beam splitter 308, which can be observed at output port 214a is provided with high resolution and high contrast.

In addition, the interferometer 304 provides a second input port 210b and a second output port 214b. Accordingly, such a configuration can facilitate the injection of a reference signal and/or the inclusion of multiple detectors.

Figure 4:
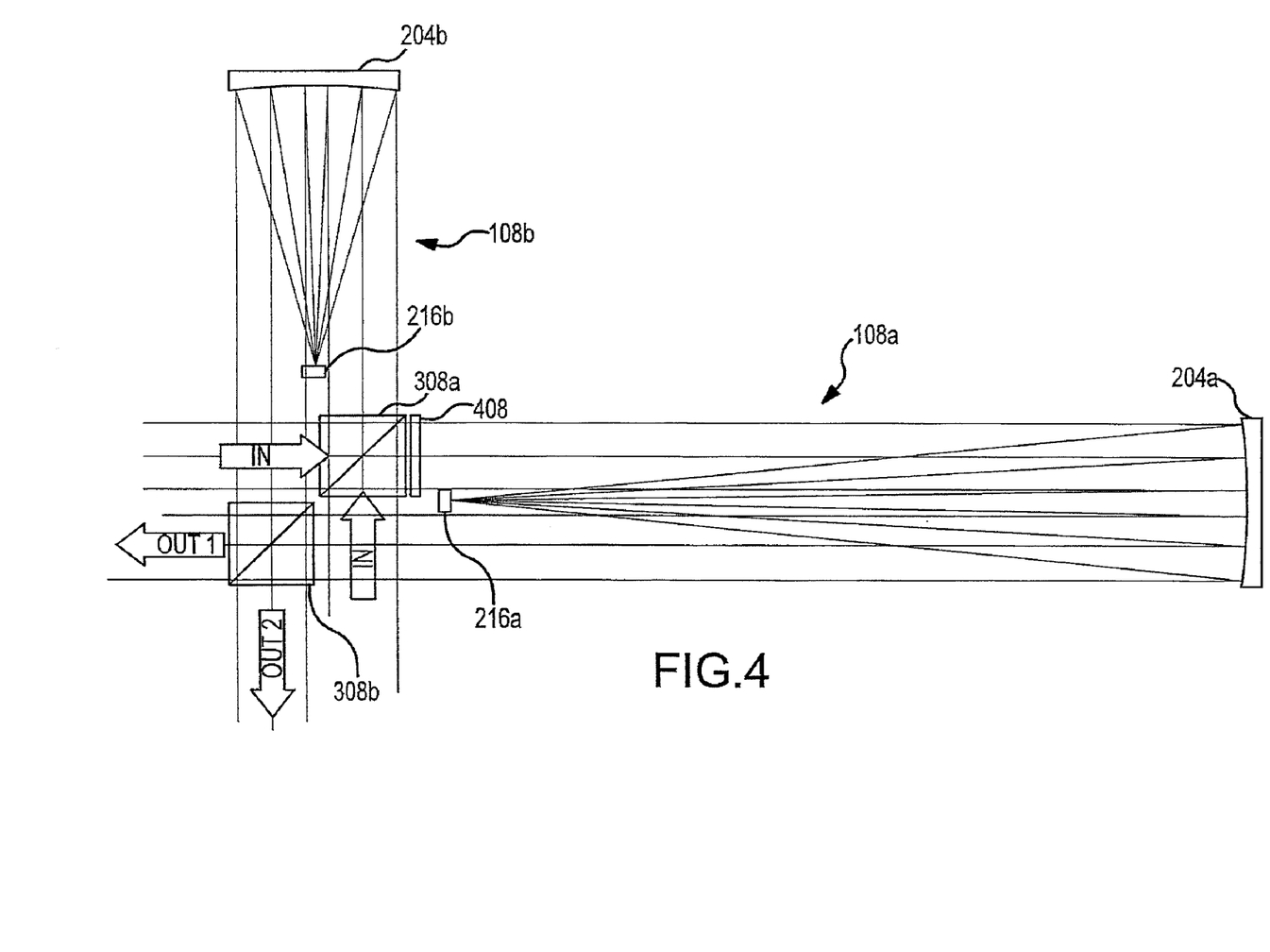
FIG. 4 is a depiction of an optical system incorporating two field widening lenses and having multiple input and multiple output ports and multiple beam splitters in accordance with embodiments of the present invention.

FIG. 4 depicts an interferometer 404 having a first field widening lens 108a and a second field widening lens 108b in accordance with still other embodiments of the present invention. The interferometer 404 includes a pair of beam splitters 308a and 308b. In particular, the first beam splitter 308a functions as an input beam splitter, while the second beam splitter 308b functions as an output beam splitter. In addition, a waveplate 408 is included, which can be used to provide multiple channels using polarization splitting techniques.

Figure 5:
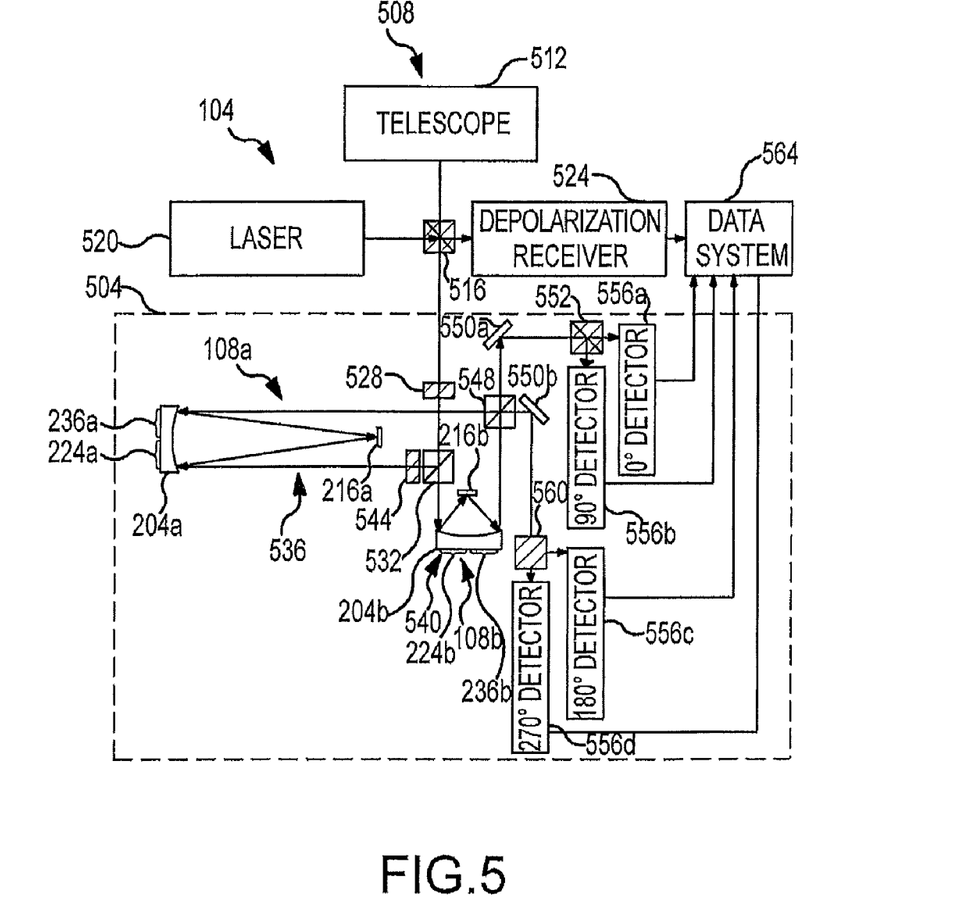
FIG. 5 is a depiction of components of an optical autocovariance receiver incorporating field widening lenses in accordance with embodiments of the present invention.

FIG. 5 illustrates an example of an optical system 104 that incorporates multiple field widening lenses 108 in accordance with embodiments of the present invention. More particularly, aspects of an optical system 104 comprising an optical autocovariance interferometer 504 provided as part of an optical autocovariance lidar 508 are illustrated. The optical autocovariance interferometer 504 in this example utilizes polarization multiplexing in order to obtain a plurality of differential delays in order to allow measurement of the phase of the optical autocovariance function experienced by reflected light collected by a telescope 512. In particular, the embodiment illustrated in FIG. 5 allows for different measurements of the intensity of the autocovariance function (ACF) of the returned signal at different relative phase delays to be determined. Using the disclosed architecture, a plurality of detectors 556 for measuring the intensity of a return signal at different points along the optical ACF of the returned signal and/or to accommodate simultaneous measurement of the optical ACF from the return signals of different wavelengths can also be included. Randomly polarized light collected by the telescope 512 is provided to a polarizing beam splitter 516, which passes the light collected by the telescope 512 as linearly polarized light to the optical autocovariance interferometer 504. In addition, the polarizing beam splitter 516 functions to reflect a sample of the light from the laser 520, which comprises a linearly polarized zero time reference signal. The polarizing beam splitter 516 can also function to provide a signal to the depolarization receiver 524, although a depolarization receiver 524 not required.

Linearly polarized light from the polarizing beam splitter 516 passed through a half wave plate 528, which rotates the polarization of the light from the polarizing beam splitter 516 by 45°. Other well known methods can be used to perform the rotation of the polarization states, for example, physical rotation of the optical path. Next, a first non-polarizing 50% beam splitter 532 divides the light, and directs one half of the light along a long arm 536 and the other half of the light along a short arm 540 of the optical autocovariance interferometer 504. The light in each arm comprises orthogonal polarizations, each containing one half the light directed to the respective arm. The light directed along the long arm 536 can be passed through a quarter wave plate 544 aligned so as to shift the phase of the light in one of the polarizations propagating in the long arm 536 by 90° with respect to the other polarization in that arm. As can be appreciated by one of skill in the art after consideration of the present disclosure, alternatively the quarter wave plate can be positioned so that the phase of one of the polarizations of light directed along the short arm 540 is shifted by 90°.

The long arm 536 of the optical autocovariance interferometer 504 comprises the first field widening lens 108a. Accordingly, the long arm 536 includes a first primary mirror 204a and a first secondary mirror 216a. The first primary mirror 204a receives light that has been directed to it by the first non-polarizing 50% beam splitter 532 at a first portion 224a of the first primary mirror 204a, and reflects that light to the first secondary mirror 216a. The first secondary mirror 216a in turn reflects that light back to the first primary mirror 204a. More particularly, light is reflected by the first secondary mirror 216a to a second portion 236a of the first primary mirror 204a. The first primary mirror 204a then reflects that light to a second non-polarizing 50% beam splitter 548. As with other cat's eye assemblies 108 in accordance with embodiments of the present invention, the distance traveled by any ray within the first field widening lens 108a is the same, regardless of the angle of incidence of the ray relative to the optical system 104, provided the ray is within the field of view 112 of the optical system 104.

The short arm 540 of the optical autocovariance interferometer 504 comprises the second field widening lens 108b. The short arm 540 therefore includes a second primary mirror 204b and a second secondary mirror 216b. The second primary mirror 204b receives light that has been directed to it by the first non-polarizing 50% beam splitter 532 at a first portion 224b of the second primary mirror 204b, and reflects that light to the second secondary mirror 216b. The second secondary mirror 216b in turn reflects that light back to a second portion 236b of the second primary mirror 204b. The second primary mirror 204b then reflects that light to a second face of the second non-polarizing 50% beam splitter that is orthogonal to the face of the second non-polarizing 50% beam splitter 548 to which the light from the long arm 536 is directed. Accordingly, the light from the two arms, 536 and 540 of the OA interferometer 504 mixes and interferes at the second non-polarizing 50% beam splitter 548. Again, as with other field widening lenses 108 in accordance with embodiments of the present invention, the distance traveled by any ray within the second field widening lens 108b is the same or essentially the same, regardless of the angle of incidence of the ray relative to the optical system 104, provided the ray is within the field of view 112 of the optical system 104. As a result, the wave front of the incoming signal is preserved by the cat's eye assemblies 108, thus providing an output that is a 1:1 conjugate of the input. Moreover, this aspect of embodiments of the present invention allows an interference pattern having good contrast and resolution to be provided.

As noted, the example optical system 104 illustrated in FIG. 5 uses polarization division multiplexing to facilitate the provision of multiple channels by the interferometer. As shown, a first half of the light received from the field widening lens 108 is reflected by the second non-polarizing 50% beam splitter 528 to a second polarizing beam splitter 552. As shown in the figure, light may be directed to the second polarization beam splitter 536 by a mirror 550a, for example to provide a more compact system. However, as can be appreciated by one of skill in the art, the mirror is not required. The second polarizing beam splitter 552 passes light having a first polarization to a 0° detector assembly 556a, and reflects light having a second polarization, orthogonal to the first polarization, to a 90° detector assembly 556b. The light passed by the second non-polarizing 50% beam splitter 548 is received by a third polarizing beam splitter 560. As shown in the figure, the light passed by the second non-polarizing 50% beam splitter 548 may be directed to the third polarization beam splitter 560 by a second mirror 550b. The third polarization beam splitter 560 reflects light having a particular polarization to a 180° detector assembly 556c, and passes light having an orthogonal polarization to a 270° detector assembly 556d. The intensity of the signals at the detector assemblies 556a-d is provided to the data system or Doppler signal processor 564. These signals represent relative phase samples of the optical ACF of the input light with the angular denotations representing approximate relative phase spacing of the samples in that autocovariance space. Other optical ACF phase spacings are feasible, providing they are known or measured, while it is advantageous to spread the samples equally over a substantial fraction of a cycle of the ACF in order to maximize the unambiguous velocity range of the lidar system. More particularly, a Doppler signal processor provided as part of or associated with the data system 564 that receives intensity information from the detector assemblies may determine the phase shift of the optical ACF of the light collected by the telescope 512 from the ratios of the detected intensities provided by the detector assemblies 556a-d.

Figure 6:
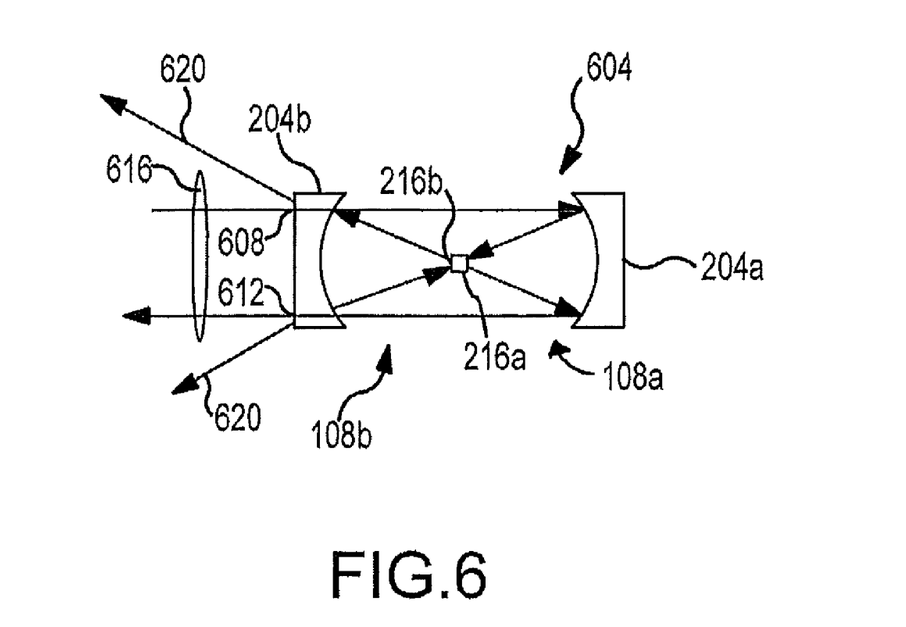
FIG. 6 depicts an etalon incorporating two field widening lenses in accordance with embodiments of the present invention.

FIG. 6 depicts components of an optical system 104 comprising an etalon 604 that includes two field widening lenses or cat's eye assemblies 108 in accordance with embodiments of the present invention. The first field widening lens 108a includes a first primary mirror 204a and a first secondary mirror 216a. The second field widening lens 108b includes a partially reflective second primary mirror 204b and a second secondary mirror 216b. Light enters the etalon 604 by passing through the second primary mirror 204b at an input port 608. That light is then reflected from the first primary mirror 204a to the first secondary mirror 216a, and from the first secondary mirror 216a back to the first primary mirror 204a. The first primary mirror 204a then reflects the light to the second primary mirror 204b. The second primary mirror 204b reflects that light to the second secondary mirror 216b, which in turn reflects that light back to the second primary mirror 204b. As shown, the first and second secondary mirrors 208 can comprise opposite sides of a single optical element.

As can be appreciated by one of skill in the art, light at certain equally spaced apart wavelengths will constructively interfere within the etalon 604 and pass through the partially reflective second primary mirror 204b through an output port 612. The length of the path followed by light entering the etalon 604, from the entrance or input port 608 to the exit or output port 612 is the same regardless of the field angle of the light within the field of view 112 of the optical instrument 104. The input port 608 and the output port 612 are offset from one another. The etalon 604 can include or be associated with compensation optics 616 to correct for the negative lensing effect in transmission through the primary mirrors 204. Rejected light can exit the etalon 604 through alternate paths 620.

Figure 7:
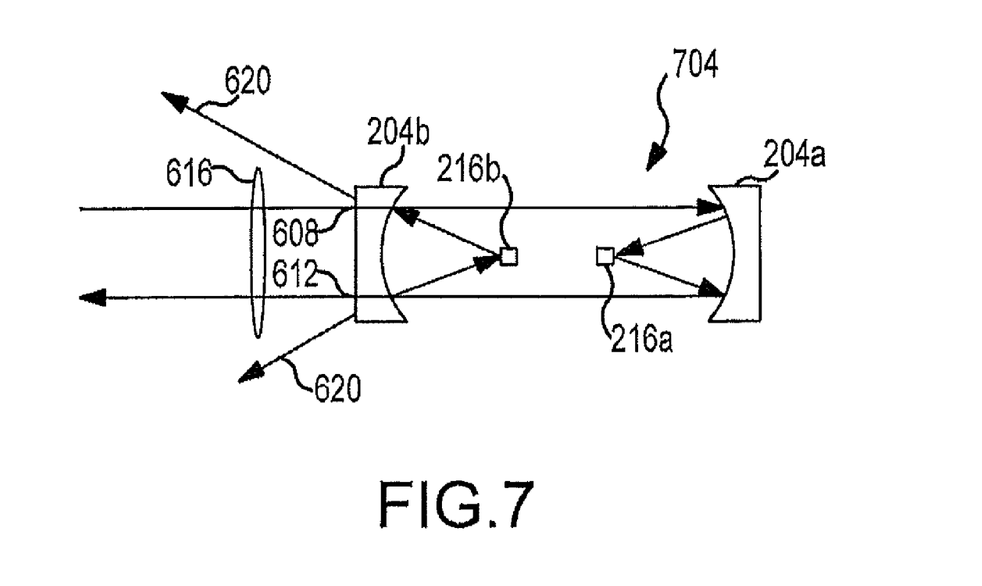
FIG. 7 depicts an etalon incorporating two field widening lenses in accordance with other embodiments of the present invention.

In FIG. 7 an optical system 104 comprising an etalon 704 with secondary mirrors 216 that are provided as separate elements is illustrated. In particular, the spacing between the reflective surface of the first secondary mirror 216a and the reflective surface of the second secondary mirror 216b can be arbitrarily large. The spacing between the primary mirrors 204 can also be arbitrarily large. As a result, higher resolution or tighter comb spacing for wavelengths that are allowed to pass out of the etalon 704 through the output port 612 can be achieved.

Figure 8:
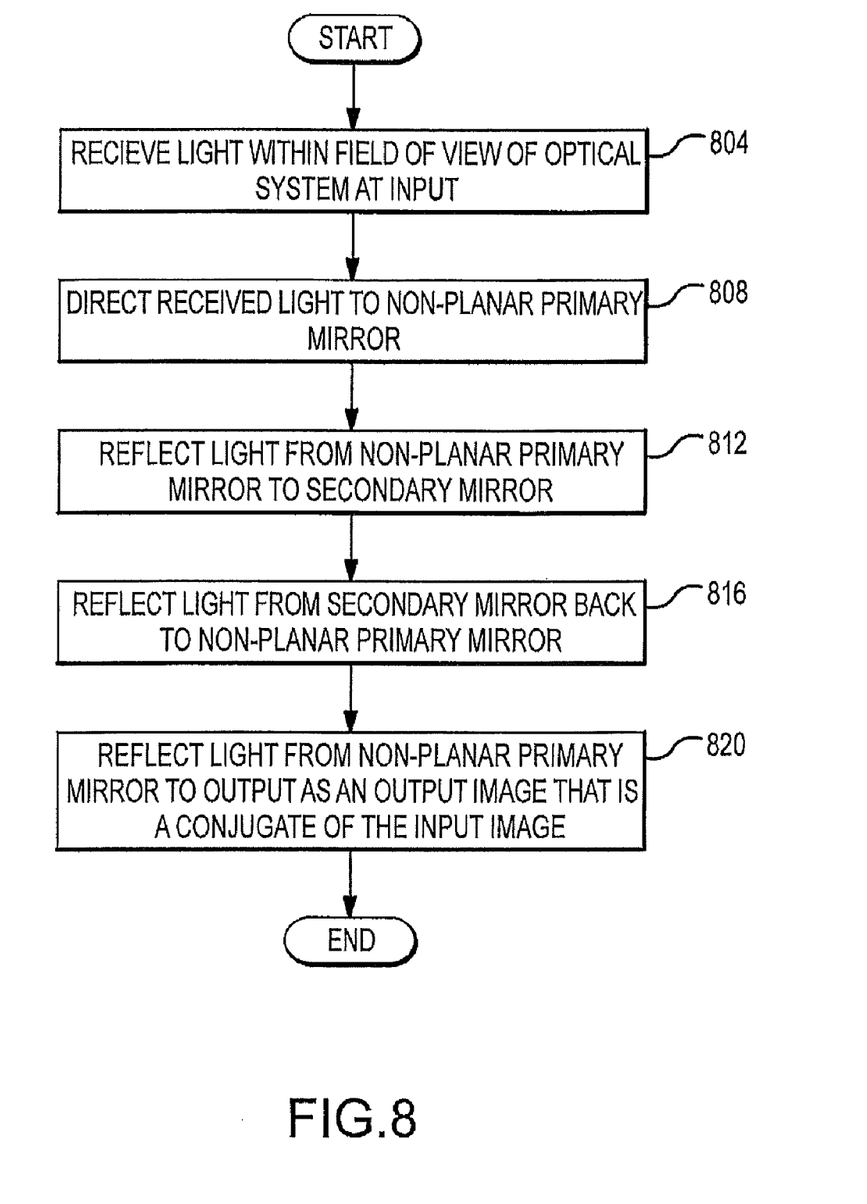
FIG. 8 is a flow chart illustrating a method for providing a reimaging field widening lens in accordance with embodiments of the present invention.

FIG. 8 depicts aspects of a process for implementing a field widening lens in accordance with embodiments of the present invention. Initially, light is received from a point within the field of view 112 of an optical system 104 (step 804). The received light is then passed to a field widening lens assembly 108 comprising a reimaging system that provides the same path length for received light, regardless of the angle within the field of view 112 of that light relative to the optical system 104. In particular, the received light is directed to a non-planar primary mirror 204 (step 808). The light is then reflected from the non-planar primary mirror 204 to a secondary mirror 216 (step 812). From the secondary mirror 216 the light is reflected back to the primary mirror 204 (step 816). Finally, the light is reflected from the primary mirror 204 to the output 214 of the field widening lens assembly 108 (step 820).

Although particular embodiments of field widening lenses 108 in accordance with embodiments of the present invention have been illustrated and described, it should be appreciated that other embodiments are possible. For instance, an optical system 104 comprising an interferometer can include a first non-planar primary mirror 204 that operates in cooperation with a secondary mirror 208 to provide a field widening lens assembly 108, and a second planar primary mirror. In addition, although embodiments have been described as incorporating unitary primary mirrors 204, since at least some embodiments of the present utilize separate portions of the primary mirror 208, a primary mirror 208 can be provided in multiple parts.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An interferometer, comprising:
   an input, wherein the input encompasses a first field of view;
   a first non-planar primary mirror;
   a first secondary mirror, wherein the first primary mirror and the first secondary mirror form a first segment of the interferometer, and wherein for any incoming ray at an angle of incidence within the first field of view an optical path length within the first segment of the interferometer is substantially the same;
   a second non-planar primary mirror;
   a second secondary mirror, wherein the second primary mirror and the second secondary mirror form a second segment of the interferometer, and wherein for any incoming ray at an angle of incidence within the first field of view a total optical path length within the second segment of the interferometer is substantially the same.

2. The interferometer of claim 1, wherein the first segment of the interferometer provides a first path length, and wherein the second segment of the interferometer provides a second path length that is different than the first path length.

3. The interferometer of claim 1, wherein the first and second secondary mirrors are non-planar.

4. The interferometer of claim 1, wherein the first primary mirror is partially reflective, and wherein the first and second primary mirrors are opposed to one another and form an etalon.

5. The interferometer of claim 4, wherein the first and second secondary mirrors are fixed to one another and face opposite directions.

6. The interferometer of claim 1, wherein the interferometer is an imaging system.

* * * * *